United States Patent [19]
Shouji et al.

[11] Patent Number: 5,796,564
[45] Date of Patent: Aug. 18, 1998

[54] MAGNETIC HEAD HAVING A RECESSED PORTION CORRESPONDING TO A MAGNETIC PATH AND METHOD OF MANUFACTURING THE SAME

[75] Inventors: Mitsuharu Shouji; Hiroyuki Ohmori, both of Kanagawa; Yasunari Sugiyama, Tokyo; Tetsuya Yamamoto, Kanagawa, all of Japan

[73] Assignee: Sony Corporation, Tokyo, Japan

[21] Appl. No.: 578,630

[22] PCT Filed: May 9, 1995

[86] PCT No.: PCT/JP95/00884

§ 371 Date: Jan. 5, 1996

§ 102(e) Date: Jan. 5, 1996

[87] PCT Pub. No.: WO95/30984

PCT Pub. Date: Nov. 16, 1995

[30] Foreign Application Priority Data

| May 9, 1994 | [JP] | Japan | 6-094769 |
| Jun. 13, 1994 | [JP] | Japan | 6-154278 |
| Jun. 30, 1994 | [JP] | Japan | 6-201272 |

[51] Int. Cl.⁶ .................................................. G11B 5/17
[52] U.S. Cl. .................................................. 360/123
[58] Field of Search .................................. 360/123, 126

[56] References Cited

U.S. PATENT DOCUMENTS

| 4,251,910 | 2/1981 | Griffith | 29/603 |
| 4,701,820 | 10/1987 | McClure | 360/125 |
| 4,927,804 | 5/1990 | Zieren et al. | 360/126 X |
| 4,964,006 | 10/1990 | Ota | 360/123 X |
| 5,170,302 | 12/1992 | Matsumoto | 360/123 |
| 5,195,233 | 3/1993 | Kitamura et al. | 29/603 |
| 5,224,003 | 6/1993 | Matsui | 360/123 X |
| 5,247,415 | 9/1993 | Kumasaka et al. | 360/126 |

FOREIGN PATENT DOCUMENTS

| A-0 614 173 A2 | 9/1987 | European Pat. Off. |
| A-0 281 931 | 9/1988 | European Pat. Off. |
| A-40 21 438 | 1/1991 | Germany. |
| A-41 15 394 | 11/1991 | Germany. |
| 1-088911 | 4/1989 | Japan. |
| 03 248305 | 6/1991 | Japan. |

OTHER PUBLICATIONS

Patent Abstracts of Japan, vol. 018, No. 409 (P-1779), Jul. 29, 1994 and JP-A-06 119612 (Sharp Corp.), Apr. 28, 1994.
Patent Abstracts of Japan, vol. 009, No. 327 (P-415), Dec. 21, 1985 and JP-A-60 151808 (TDK KK), Aug. 9, 1985.
Patent Abstracts of Japan, vol. 005, No. 113 (P-089), Nov. 13, 1981 and JP-A-56 107325 (Fujitsu Ltd.), Aug. 26, 1981.

(List continued on next page.)

Primary Examiner—John H. Wolff
Attorney, Agent, or Firm—Hill, Steadman & Simpson

[57] ABSTRACT

This invention has a principal object to eliminate, in a magnetic head and a method of manufacturing the same, the necessity of filling glass, etc. onto a magnetic film to thereby improve reliability of the magnetic head.

This invention resides in a method of manufacturing a magnetic head including a pair of magnetic core half bodies opposite to each other, each of the magnetic core half bodies being such that a magnetic film is formed on a base, in which a thin film coil is formed at least at one surface of butting plane surfaces between these magnetic core half bodies, characterized in that, in forming the magnetic film on the base, recessed portions are formed in advance by ion milling, etc. at the base to form the magnetic film at the recessed portions. In this case, it is desirable that the magnetic film consists of a magnetic film having axis of easy magnetization in the depth direction of the magnetic gap and a magnetic film having axis of easy magnetization perpendicular to the axis of easy magnetization.

16 Claims, 17 Drawing Sheets

OTHER PUBLICATIONS

Patent Abstracts of Japan, vol. 010, No. 298 (P–505), Oct. 9, 1986 and JP–A061 115212 (Fujitsu Ltd.), Jun. 2, 1986.

Patent Abstracts of Japan, vol. 010, No. 089 (P–1692), Feb. 14, 1994 and JP–A–05 290325 (Matsushita Electric Ind. Co., Ltd.), Nov. 5, 1993.

Patent Abstracts of Japan, vol. 018, No. 293 (P–1747), Jun. 3, 1994 and JP–A–06 052516 (Ricoh Co., Ltd.), Feb. 25, 1994.

Patent Abstracts of Japan, vol. 016, No. 317 (P–1384), Jul. 10, 1992 and JP–A–04 090111 (Mitsubishi Electric Corp.), Mar. 24, 1992.

Patent Abstracts of Japan, vol. 003, No. 670 (E–117), Jun. 16, 1979 and JP–A–54 047616 (Hitachi Ltd.), Apr. 14, 1979.

Patent Abstracts of Japan, vol. 017, No. 590 (P–1635), Jul. 13, 1993 and JP–A–05 174318 (NEC Kansai Ltd.), Jul. 13, 1993.

MAGNETIC HEAD HAVING A RECESSED PORTION CORRESPONDING TO A MAGNETIC PATH AND METHOD OF MANUFACTURING THE SAME

TECHNICAL FIELD

This invention relates to a magnetic head suitable for video tape recorders or magnetic disc units, etc., and more particularly to a magnetic head in which coil is formed by the thin film process and a method of manufacturing such a magnetic head.

BACKGROUND ART

As a magnetic head used in a magnetic recording/ reproducing apparatus such as Video Tape Recorder (VTR) or magnetic disc unit, etc., the so-called metal-in gap type magnetic head in which a metallic magnetic film is formed on the surface where the magnetic gap is formed of a magnetic core consisting of ferrite, the so-called laminate type magnetic head where a metallic magnetic film is caused to be put between bases (substrates) consisting of a pair of non-magnetic materials, and the like are used. Such magnetic heads are required to exhibit more satisfactory electromagnetic conversion characteristic particularly in the higher frequency band in order to cope with realization of high picture quality and/or implementation in a digital form.

However, the above-mentioned metal-in gap type magnetic head has large impedance and is not suitable for use at higher frequency.

Moreover, in the case of the laminate type magnetic head, when the track width is reduced for implementation of high density recording, it is necessary to reduce film thickness of the metallic magnetic film constituting a magnetic path, resulting in lowered reproduction efficiency. Further, since the magnetic path is formed only by the metallic magnetic film, there is the problem in control of magnetic anisotropy of the metallic magnetic film. As a result, it is difficult to obtain high reproduction efficiency. The reason thereof is as follows. While it is generally ideal for the magnetic anisotropy of the magnetic head that the axis of easy magnetization is always perpendicular to the direction of magnetic flux, it is difficult to allow the axis of easy magnetization of the metallic magnetic film to be always in a direction perpendicular to the direction of magnetic flux. In the present state, there only exist isotropic (non-orientation) films having no anisotropy, and films having uni-axial anisotropy in one direction even if there is any anisotropy.

In view of the above, as a magnetic head to cope with high frequency, there have been proposed, for example, as described in the Japanese Patent Application Laid Open No. 231713/1988 Publication and/or the Japanese Patent Application Laid Open No. 248305/1988 Publication, magnetic heads in which the magnetic path constituted with the metallic magnetic film is caused to be smaller than that of the ordinary magnetic head, and a thin film coil is formed on the surface where the magnetic gap is formed by using the thin film process.

However, since such a magnetic head as described in the Japanese Patent Application Laid Open No. 231713/1988 Publication has the process step of forming a metallic magnetic film on a base (substrate) thereafter to fill glass, etc. of low melting point onto the metallic magnetic film to flatten it, there is limitation in magnetic films which can be used. Namely, magnetic films consisting of material to which heat treatment cannot be implemented such as amorphous magnetic material, etc. cannot be used. Moreover, in the case of magnetic films consisting of material which is easy to react with glass such as nitrogen (nitride) system magnetic material, etc., foaming, etc. is produced by reaction with glass, resulting in insufficient filling of glass. Therefore, such magnetic films are not suitable. In the case where any magnetic film easy to react with glass is positively used, processing for suppressing reaction is required, disadvantageously resulting in increased number of process steps. Further, in the case of magnetic heads of such type, since filled glass, etc. is exposed onto the medium slide surface, there is also the problem that the abrasion resistive property is deteriorated.

On the other hand, in the case of magnetic heads as described in the Japanese Patent Application Laid Open No. 248305/1988, a plurality of laminated bases (substrates) in which metallic magnetic films are stacked on the base through an insulating layer or layers are made up to join (connect) these laminated bases by glass fusion to allow the joined base to be a head block to make up a magnetic head on the basis of the head block. In such magnetic heads, recessed portions for forming thin film coil are formed by implementing ion milling, etc. onto the plane surface portion consisting of the base and the magnetic film. However, since the milling rates of the base and that of the magnetic film are different from each other, it is difficult to form recessed portions consisting of a uniform plane surface. Moreover, there is a high possibility that the pitch of the mask pattern of lithography may deviate, in forming the thin film coil on the head block, due to unevenness of the film thickness distribution of the magnetic film or peeling (separation) of the magnetic film, etc., this resulting in the problem that yield is lowered to much degree. Further, since the joining portion of the laminated base is caused to be a magnetic film over the entire surface thereof, there is the problem that warp (curvature) may take place at the base by difference between stress of the magnetic film and that of the base. In addition, if such a warp takes place, the close contact property between the magnetic film, the glass and the base is lowered, resulting in weakened bonding strength.

SUMMARY OF THE INVENTION

This invention has been proposed in order to solve the drawbacks with the above-described conventional magnetic heads, and its object is to provide a magnetic head exhibiting satisfactory electromagnetic conversion characteristic in the higher frequency band in which there is no necessity of filling glass, etc. onto the magnetic film, reliability is high, abrasion resistive characteristic is excellent, and yield is satisfactory, and a method of manufacturing such a magnetic head.

A further object of this invention is to provide a magnetic head in which axis of easy magnetization of the magnetic film is always substantially perpendicular to the direction of magnetic flux, and the reproduction efficiency is excellent, and a method of manufacturing such a magnetic head.

DISCLOSURE OF THE INVENTION

A magnetic head according to this invention which has been completed in order to attain the above-described objects is directed to a magnetic head including a pair of magnetic core half bodies opposite to each other, each of the magnetic core half bodies being such that a magnetic film is formed on a base (substrate), in which a thin film coil or coils is or are formed at least at one surface of butting surfaces between the magnetic core half bodies, wherein a recessed portion having a shape corresponding to a magnetic path shape of the magnetic core half body is formed at the base, and the magnetic film is formed at the recessed portion.

At the magnetic head, formation of the recessed portion is not particularly limited if the recessed portion in a form corresponding to the magnetic path shape of the magnetic core half body can be formed at the base, and such recessed portion may be formed by, e.g., ion milling. It is to be noted that the recessed portion is caused to preferably take such a shape to avoid the portion where the thin film coil is to be formed. Moreover, it is preferable that the magnetic film consists of two kinds of magnetic films having axes of easy magnetization perpendicular to each other. In this case, it is desirable that axis of easy magnetization of one of two kinds of magnetic films having axes of easy magnetization perpendicular to each other is caused to be in the depth direction of the magnetic gap.

In the above-mentioned magnetic head, the thin film coil may be formed at a recessed portion formed so as to take coil pattern shape at the magnetic core half body. In this case, it is preferable that thin film coils may be formed at both of a pair of magnetic core half bodies, and these thin film coils are electrically connected to each other so that a single coil is constituted. Further, it is preferable that the thin film coil is buried (embedded) down to the level which dose not reach the opening of the recessed portion formed so as to take coil pattern shape.

In the above-mentioned magnetic head, the thin film coil formed at least at one of the magnetic core half bodies may consist of a first thin film coil and a second thin film coil. In this case, it is desirable that the first thin film coil and the second thin film coil are formed on the plane surfaces different from each other. In addition, it is desirable that the first thin film coil and the second thin film are electrically connected so that a single coil is constituted.

Moreover, it is desirable that, in allowing the thin film coil to consist of the first thin film coil and the second thin film coil in this way, the first and second thin film coils are constituted so that they are subjected to dielectric isolation through an insulating layer.

Further, it is desirable that, in allowing the thin film coil to consist of the first thin film coil and the second thin film coil as stated above, a recessed portion is provided at the surface of the side where the thin film coil is formed of the magnetic core half body and the first and second thin film coils are formed within the recessed portion.

Further, in allowing the thin film coil to consist of the first thin film coil and the second thin film coil as stated above, both the first and second thin film coils are formed at both of a pair of magnetic core half bodies, and a single coil terminal portion constituted by the both thin film coils may be taken out from both of the respective magnetic core half bodies.

Further, in allowing both the first and second thin film coils to be formed at both of a pair of magnetic core half bodies as stated above, it is desirable that, in respective pair of magnetic core half bodies, the winding directions of the first and second thin film coils are caused to be the same, and it is desirable that, when viewed from the magnetic gap surface, winding directions of the first and second thin film coils at the both magnetic core half bodies are caused to be the same.

Further, in allowing both the first and second thin film coils to be formed at both of a pair of magnetic core half bodies, it is preferable that when the thin film coil of the lower layer is caused to be the first thin film coil, and the thin film coil of the upper layer is caused to be the second thin film coil, respective thin film coils are connected so that the outside termination of the first thin film coil of the first magnetic core half body is connected to a first terminal portion, the inside termination of the first thin film coil of the first magnetic core half body is connected to the inside termination of the second thin film coil of the second magnetic core half body, the outside termination of the second thin film coil of the second magnetic core half body is connected to the outside termination of the second thin film coil of the first magnetic core half body, the inside termination of the second thin film coil of the first magnetic core half body is connected to the inside termination of the first thin film coil of the second magnetic core half body, and the outside termination of the first thin film coil of the second magnetic core half body is connected to a second terminal portion.

On the other hand, a method of manufacturing a magnetic head of this invention is directed to a method of manufacturing a magnetic head including a pair of magnetic core half bodies opposite to each other, each of the magnetic core half bodies being such that a magnetic film is formed on a base, in which a thin film coil is formed at least at one surface of butting plane surfaces between the magnetic core half bodies, wherein, in forming the magnetic film on the base, a recessed portion or portions is or are formed in advance at the base and the magnetic film is formed at the recessed portion or portions.

In the method of manufacturing the magnetic head, the method for forming the recessed portion is not particularly limited if recessed portions can be formed at the portions where the magnetic film is formed. For example, ion milling may be employed for this purpose. It is to be noted that it is preferable to allow the recessed portion to take such a shape to avoid the portion where the thin film coil is to be formed.

In addition, in the method of manufacturing the magnetic head, it is preferable that formation of the magnetic film is formation of two kinds of magnetic films of a magnetic film having axis of easy magnetization in one direction and a magnetic film having axis of easy magnetization perpendicular to the above-mentioned axis of easy magnetization. In this case, it is further preferable that, in forming two kinds of magnetic films having axes of easy magnetization perpendicular to each other, the axis of easy magnetization of one magnetic film is caused to be in the depth direction of the magnetic gap.

In such a magnetic head according to this invention and a magnetic head manufactured by the method of manufacturing such a magnetic head, recessed portion having a shape corresponding to the magnetic path shape of the magnetic core half body is formed at the base, and a magnetic film is formed at the recessed portion. For this reason, there is no possibility that unnecessary opening or groove, etc. is formed, and it is unnecessary to fill glass, etc. Accordingly, in this invention, even if magnetic film consisting of material easy to react with glass such as nitrogen (nitride) system magnetic material, etc., and magnetic film consisting of material to which heat treatment cannot be implemented such as amorphous magnetic material, etc. are employed, such materials can be used without problem. In addition, in the case of this magnetic head, since there is no possibility that filling material such as glass, etc. may be exposed to the medium slide surface, excellent abrasion resistive property can be obtained.

Moreover, since the magnetic film is formed only within the recessed portion, there is hardly possibility that any warp (curvature) may take place at the base by difference between stress of the magnetic film and that of the base. For this reason, a magnetic head having high bonding strength between the magnetic film and the base and high reliability can be obtained.

Further, the recessed portion is formed by ion milling, thereby making it possible to form the recessed portion at high speed and precisely.

Further, the recessed portion is caused to take such a shape to avoid the portion where the thin film coil is to be formed, whereby formation of the thin film coil is not carried out on the magnetic film, but is carried out on the base. Accordingly, in forming the thin film coil, thin film process is implemented mainly to the base, resulting in no possibility that thin film process is implemented to the magnetic film.

In addition, the magnetic film is formed by two kinds of magnetic films having axes of easy magnetization perpendicular to each other, whereby control of the magnetic anisotropy of the magnetic film can be made. Particularly, the axis of easy magnetization of one of two kinds of magnetic films having axes of easy magnetization perpendicular to each other is caused to be in the depth direction of the magnetic gap, whereby the axis of easy magnetization of the magnetic film is caused to be always substantially perpendicular to the direction of magnetic flux. Thus, the reproduction efficiency of the magnetic head is improved.

DETAILED DESCRIPTION OF THE PRESENTLY PREFERRED EMBODIMENTS

More practical embodiments to which this invention is applied will now be described in detail with reference to the attached drawings.

Embodiment 1

A magnetic head of this embodiment is directed to a magnetic head in which recessed portion having a shape corresponding to the magnetic path shape of the magnetic core half body is formed at the base and a magnetic film is formed at the recessed portion.

Figure 1:
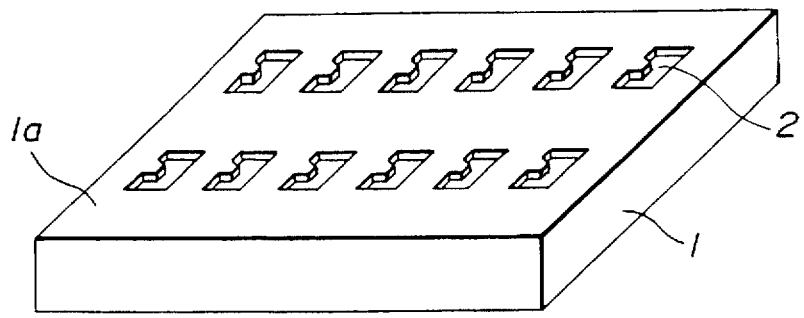
FIG. 1 is a schematic perspective view showing a process for forming recessed portions for magnetic film onto a base in illustration in order of process steps of a manufacturing process of a magnetic head of the embodiment 1.

In manufacturing the magnetic head of this embodiment, a base (substrate) in a flat plate form comprised of non-magnetic body such as crystallized glass or non-magnetic ceramic, etc. is first prepared. Then, as shown in FIG. 1, patterning is carried out by using the photolithography technology with respect to one principal surface 1a of base 1 to form recessed portions 2 for magnetic film having the shape corresponding to the magnetic path shape of the magnetic core half body by ion milling, etc. In this example, the recessed portion 2 for magnetic film is caused to have the depth thereof more than desired track width, and to allow the shape thereof to take such a substantially channel-shape to avoid the portion where the thin film coil is to be formed in order that thin film coil is formed on the base at subsequent step.

Figure 2:
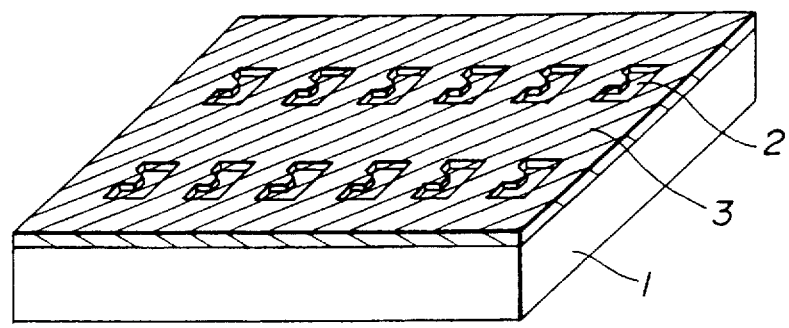
FIG. 2 is a schematic perspective view showing film formation process of metallic magnetic film.

Then, as shown in FIG. 2, a metallic magnetic film 3 is formed on the principal surface 1a of the base 1 where the recessed portions 2 for magnetic film have been formed by the sputtering method or the vacuum deposition method, etc. in a manner to include the portions within the recessed portions 2 for magnetic film. In this case, as the metallic magnetic film 3, any film having high saturation magnetic flux density and having satisfactory soft magnetic characteristic may be employed. For example, FeAlSi film, FeRuGaSi film, FeHfTaN film, FeAlN film, and amorphous film having thickness of several μm, etc. are enumerated. In addition, this metallic magnetic film 3 may be single layer film, or laminated film laminated (stacked) through insulating film such as $SiO_2$, etc.

Figure 3:
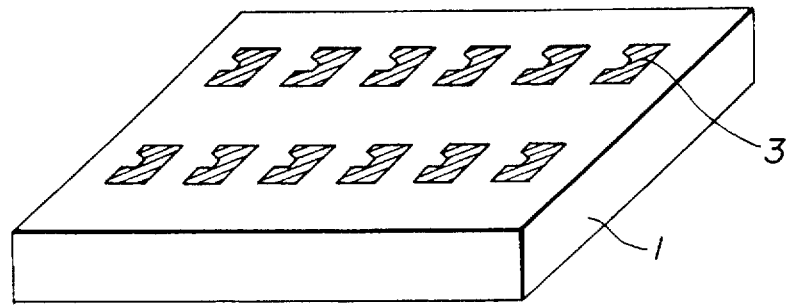
FIG. 3 is a schematic perspective view showing process for removing unnecessary metallic magnetic film.

Then, as shown in FIG. 3, ion milling or mirror processing, etc. is implemented to the surface where the metallic magnetic film 3 is formed to remove unnecessary portions of the metallic magnetic film 3 thereafter to implement mirror processing thereto. At this time, the metallic magnetic film 3 is formed so that it is left only within the recessed portions 2 for magnetic film and the film thickness of the remaining portion is equal to the track width.

Figure 4:
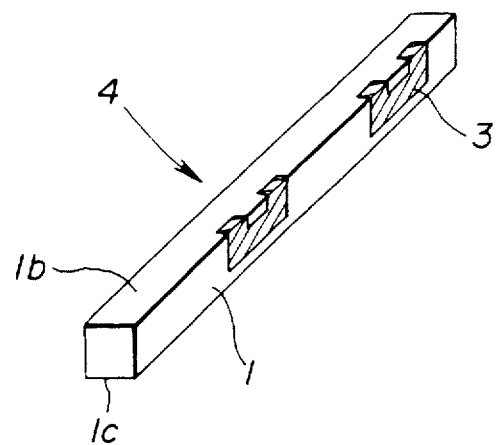
FIG. 4 is a schematic perspective view showing a process for making up a tanzaku (strip of fancy paper) shaped base.

Then, as shown in FIG. 4, the base 1 on which the metallic magnetic film 3 has been formed is cut in a tanzaku (strip of fancy paper) form to make up tanzaku-shaped bases 4. At this time, one cutting plane 1b is caused to be butting plane surface between the magnetic core half bodies and the other cutting plane 1c is caused to be the plane surface of the opposite side of the butting plane surface.

Figure 5:
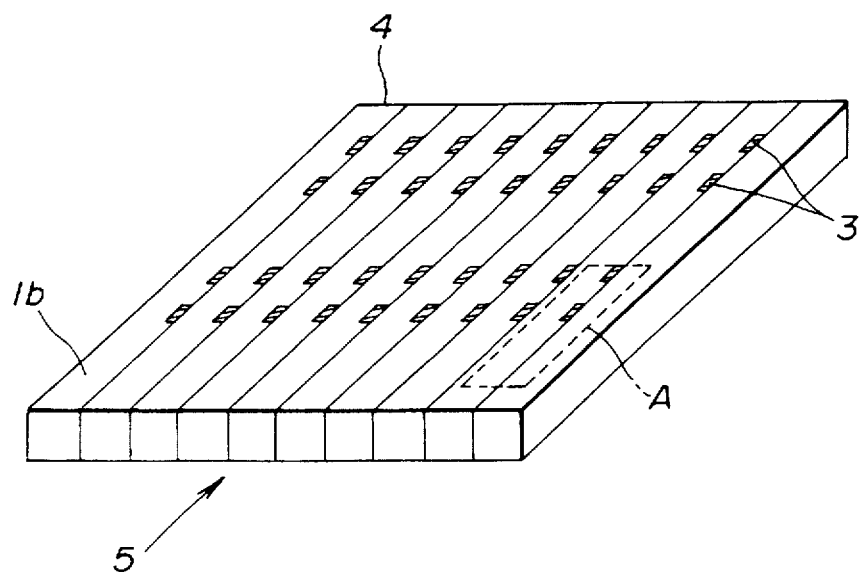
FIG. 5 is a schematic perspective view showing a process for making up a joined base.

Then, as shown in FIG. 5, a plurality of tanzaku-shaped bases 4 are joined (connected) and integrated to make up a joined base 5. At this time, joining is made so that the butting surface is caused to be the upper portion principal surface 1b. In this example, joining is carried out by glass fusion or low temperature metal joining (e.g., diffusion joining of gold), etc.

Then, thin film coils are formed on the joined base 5 by the thin film process. It is to be noted that while a plurality of magnetic core half bodies are made up from the single joined base 5, and those thin film coils are formed in correspondence with individual magnetic core half bodies, explanation will be given in the state where the portion corresponding to one magnetic core half body within the joined base (the portion encompassed by broken lines A in FIG. 5) is enlarged.

Figure 6:
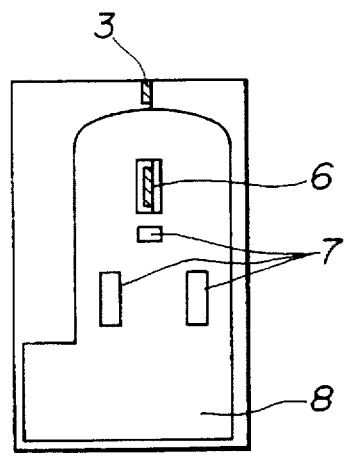
FIG. 6 is a schematic plan view showing a process for forming recessed portion for thin film coil.

Initially, as shown in FIG. 6, patterning of a back gap portion 6 which is to be positioned substantially at the center of the thin film coil and electrode contact portions 7 which serve to connect thin film coils of respective magnetic core half bodies when a pair of magnetic core half bodies are joined and integrated is made by using the photolithography technology at the plane surface serving as the butting plane surface between magnetic core half bodies thereafter to form a recessed portion 8 for thin film coil at the portion where the thin film coil is formed by ion milling, etc. At this time, the electrode contact portion 7 is caused to be lower than the back gap portion 6 by 2~3 μm.

Figure 7:
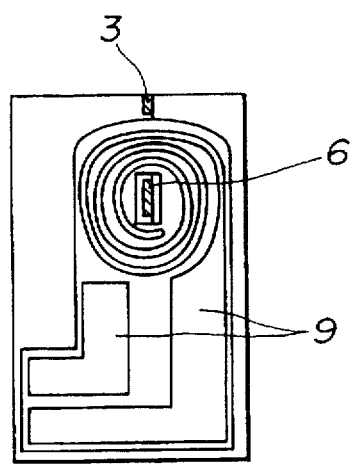
FIG. 7 is a schematic plan view showing a process for forming thin film coil.

Then, as shown in FIG. 7, patterning is carried out by using the photolithography technology into the recessed portion 8 for thin film coil to form thin film coils 9 by the vacuum deposition method or the plating, etc. It is to be noted that any good conductor may be employed as material of the thin film coil 9, and, e.g., Au, Ag, Cu and Al, etc. are enumerated.

Figure 8:
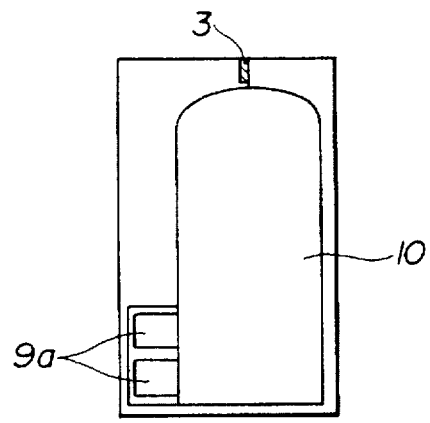
FIG. 8 is a schematic plan view showing a process for forming an insulating film which is a protective layer of the thin film coil.

Then, as shown in FIG. 8, the portion within the recessed portion 8 for thin film coil is buried by an insulating film 10 serving as a protective film of the thin film coil 9. It should be noted that lead-out electrode portions 9a of the thin film coil 9 are caused to remain exposed. As material of the insulating film, $SiO_2$ and $Al_2O_3$, etc. are enumerated.

Figure 9:
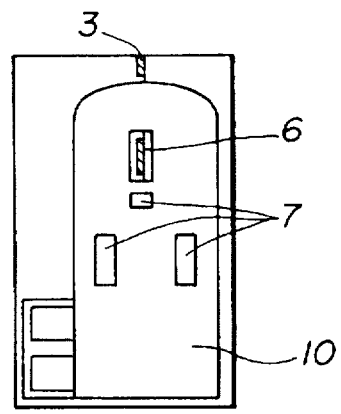
FIG. 9 is a schematic plan view showing a process in which mirror processing is implemented to allow back gap portion and electrode contact portion to be exposed.

Then, as shown in FIG. 9, mirror processing is implemented to the surface where the insulating film 10 has been formed until the back gap portion 6 and the electrode contact portions 7 are exposed.

Figure 10:
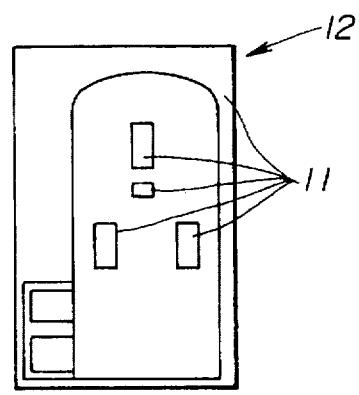
FIG. 10 is a schematic plan view showing a process for forming good conductor metallic films for forming magnetic gap and for joining magnetic core half body.

Then, as shown in FIG. 10, patterning is carried out by using the photolithography technology with respect to the portion except for the recessed portion 8 for thin film coil, the back gap portion 6 and the electrode contact portions 7 to form good conductor metallic films 11 for use in formation of magnetic gap and bonding when joining between a pair of magnetic core half bodies is made. As good conductor metal used in this example, e.g., Au, Sn, etc. are enumerated.

Then, a magnetic head is made up from magnetic core half body 12 in which the magnetic film 3 and the thin film coil 9 are formed on the base 1, which has been made up in a manner as described above.

Figure 11:
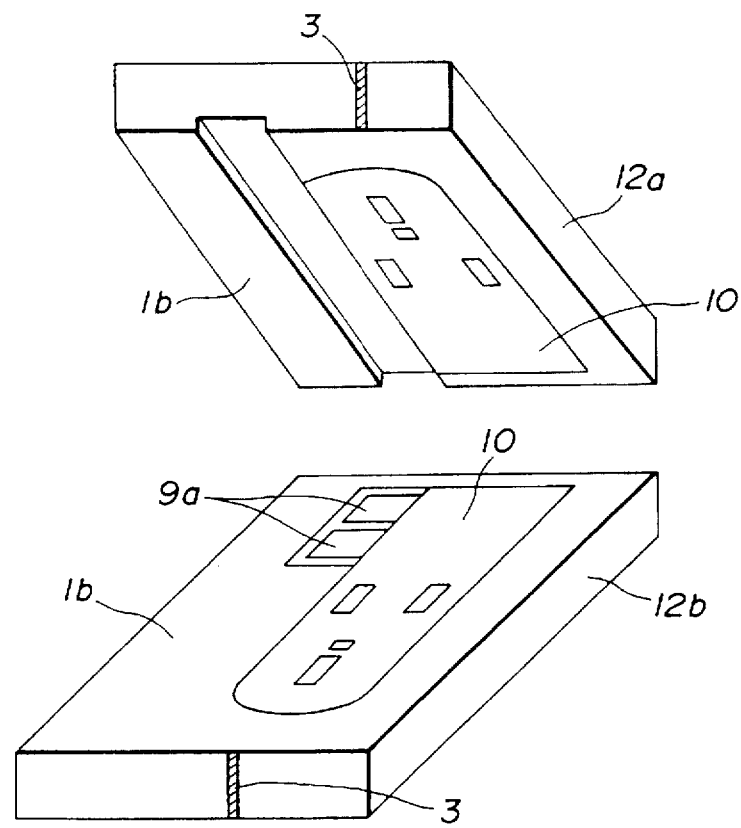
FIG. 11 is a schematic perspective view showing a process for butting a pair of magnetic core half bodies.
Figure 12:
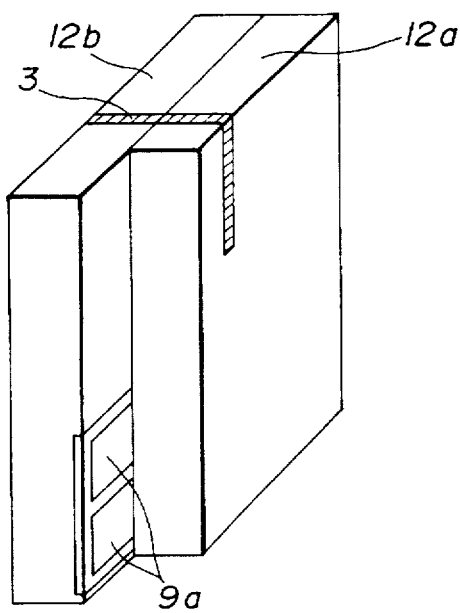
FIG. 12 is a schematic perspective view showing joined state of a pair of magnetic core half bodies.

Initially, as shown in FIG. 11, a pair of magnetic core half bodies 12a, 12b are caused to undergo processing such that butting plane surfaces 1b where the thin film 9 is formed are butted to each other. They are then joined and integrated, as shown in FIG. 12, by bonding (connecting) them at a suitable temperature while applying pressure. At this time, since the portion within the recessed portion 8 for thin film coil where the thin film 9 is formed is protected by the insulating film 10, there is no possibility that unexpected breaking of wire or short-circuit may take place. It is to be noted that, in butting a pair of magnetic core half bodies 12a, 12b, setting is made such that the projected lead-out electrode of the thin film coil 9 of the side surface side of one magnetic core half body 12a is cut so that its length is shortened, and a lead-out electrode portion 9a of the thin film coil formed at the other magnetic core half body 12b is exposed to the external.

Figure 13:
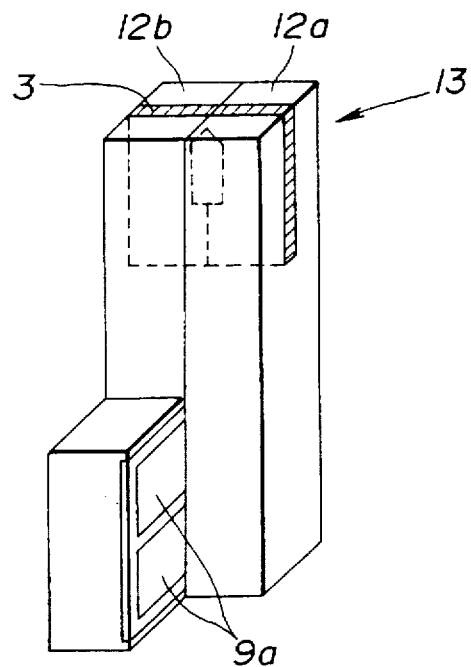
FIG. 13 is a schematic perspective view showing a magnetic head obtained by the embodiment 1.

Finally, as shown in FIG. 13, chip cutting is carried out by the slicing processing to quarry out (cut down) it every respective magnetic head units. Thus, magnetic head 13 is made up.

In the magnetic head of this embodiment as described above, the thin film coil has been already formed. Accordingly, there is no necessity of implementing winding at later stage.

Moreover, differently from the conventional magnetic head, there is no possibility that unnecessary opening or groove, etc. may be formed. Thus, there is no necessity of filling glass, etc. For this reason, even magnetic film easy to react with glass, etc. can be used. Further, since heat treatment for filling glass, etc. is unnecessary, even a magnetic film such that the characteristic is deteriorated when heat treatment is conducted can be used. It is to be noted that, in the case where a magnetic film of which characteristic is deteriorated when heat treatment is carried out is used, it is desirable to carry out joining between the tanzaku shaped bases by low temperature metal joining (e.g., diffusion joining of gold), etc.

Moreover, in forming the thin film coil, thin film process is not implemented to the magnetic film, but such thin film process is implemented mainly to the base. For this reason, formation of the thin film coil is easy.

Further, since there is also no possibility that filled glass, etc. may be exposed to the medium slide surface, the abrasion resistive property is also excellent.

Embodiment 2

The magnetic head of this embodiment is directed to a magnetic head in which the magnetic film consists of two kinds of magnetic films having axes of easy magnetization perpendicular to each other.

Figure 14:
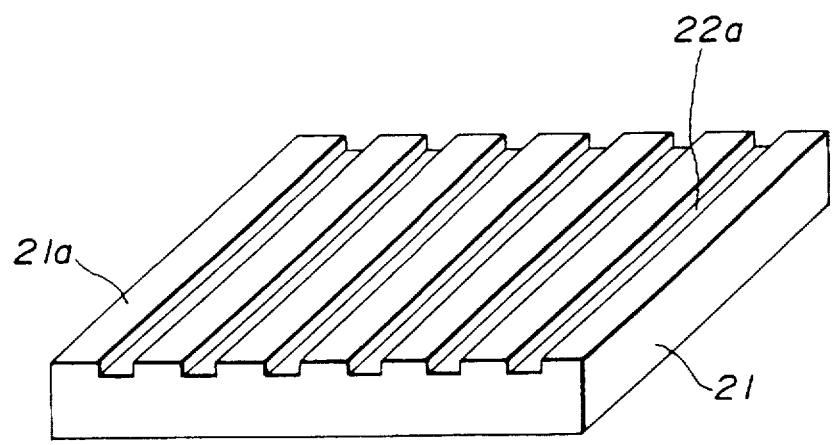
FIG. 14 is a schematic perspective view showing a process for forming longitudinal grooves which are recessed portions for magnetic film onto the base in illustration in order of process steps of a process for manufacturing a magnetic head of the embodiment 2.

In manufacturing the magnetic head of this embodiment, a base (substrate) in a flat plate form consisting of non-magnetic body such as crystallized glass or non-magnetic ceramic, etc. is initially prepared. Then, as shown in FIG. 14, a plurality of longitudinal grooves 22a are formed as a recessed portion for magnetic film with respect to one principal surface 21a of a base 21. It is to be noted that the above-mentioned longitudinal grooves 22a may be formed by machining, or may be formed by a method in which the photolithography technology is used to carry out patterning thereafter to conduct ion milling, etc. In addition, the above-mentioned longitudinal grooves 22a are formed so that they are in parallel to the depth direction of the desired magnetic gap and has a depth greater than the desired track width.

Figure 15:
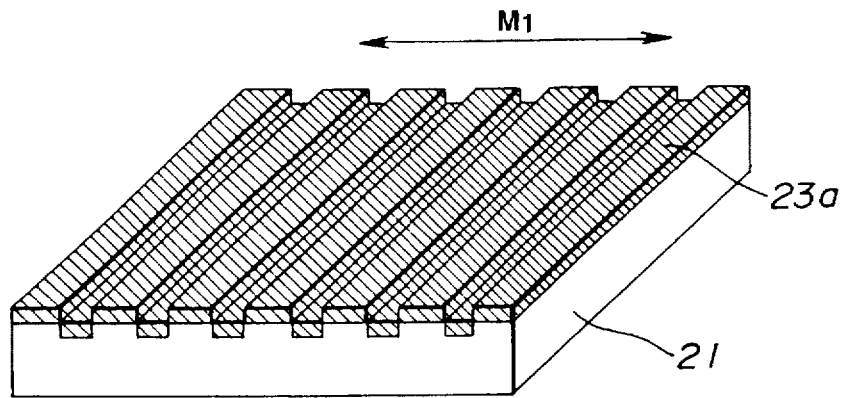
FIG. 15 is a schematic perspective view showing a process for forming metallic magnetic film into longitudinal grooves.

Then, as shown in FIG. 15, on the principal surface 21a of the base 21 where the longitudinal grooves 22a are formed, a metallic magnetic film 23a having uniaxial magnetic anisotropy is formed by the sputtering method or the vacuum deposition method in a manner to include the internal portions of the longitudinal grooves 22a so that the axis M1 of easy magnetization is caused to be perpendicular to the direction in which the longitudinal grooves 22a are formed as indicated by the arrow in the figure. As the method of rendering the axis M1 of easy magnetization, e.g., a method of carrying out formation of film in magnetic field and a method in which the base is inclined to vary incident direction of sputter particles to thereby give anisotropy, etc. are enumerated.

Figure 16:
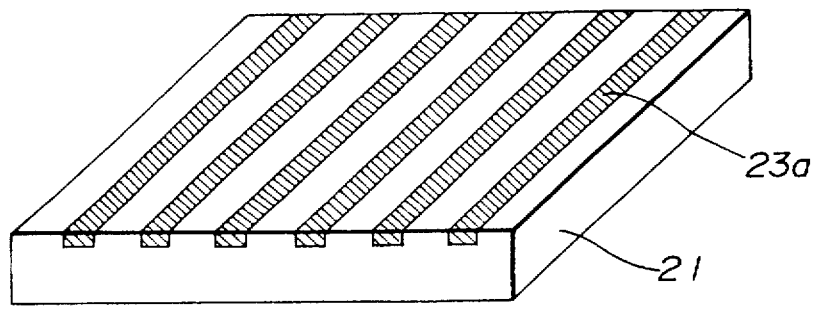
FIG. 16 is a schematic perspective view showing a process for removing unnecessary metallic magnetic film.

Then, as shown in FIG. 16, ion milling or mirror processing, etc. is implemented to the surface where the metallic magnetic film 23a is formed to remove unnecessary portions of the metallic magnetic film 23a thereafter to implement the mirror processing thereto. At this time, the metallic magnetic film 23a is caused to undergo processing such that it is left only within the longitudinal grooves 22a and the film thickness of the remaining portion is set to the track width or more.

Figure 17:
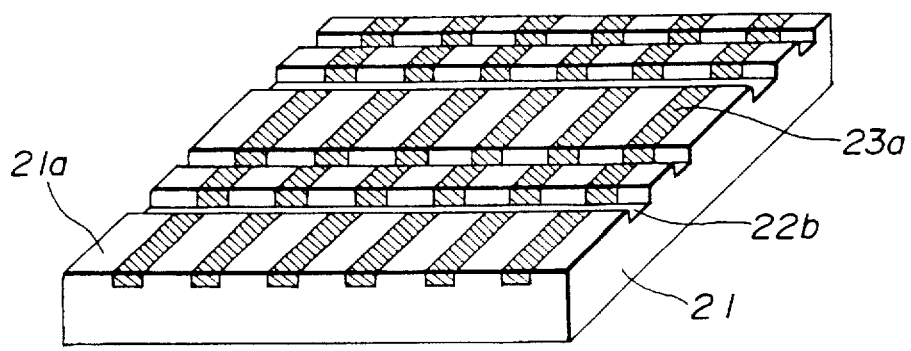
FIG. 17 is a schematic perspective view showing a process for forming lateral grooves which are recessed portions for magnetic film onto the base.

Then, as shown in FIG. 17, a plurality of lateral grooves 22b perpendicular to the longitudinal grooves 22a are formed as a recessed portion for magnetic film, with respect to the principle surface 21a of the base 21 in which the metallic magnetic film 23a is formed within the longitudinal grooves 22a. It is to be noted that, similarly to formation of the longitudinal grooves 22a, the lateral grooves 22b may be formed by machining, or may be formed by a method in which the photolithography technology is used to carry out patterning thereafter to conduct ion milling, etc. In addition, the lateral groove 22b is formed so as to have the same depth as that of the longitudinal groove 22a.

Figure 18:
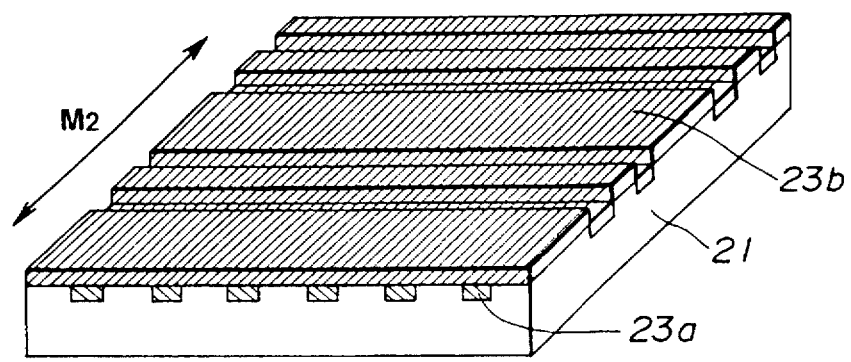
FIG. 18 is a schematic perspective view showing a process for forming metallic magnetic film into the lateral grooves.

Then, as shown in FIG. 18, on the principal surface 21a of the base 21 where lateral grooves 22b are formed, a metallic magnetic film 23b having uniaxial magnetic anisotropy is formed by the sputtering method or the vacuum deposition method, etc. in a manner to include the portions within the lateral grooves 22b so that the axis M2 of easy magnetization is perpendicular to the direction in which the lateral grooves 22b are formed as indicated by the arrow in the figure. It is to be noted that the method of giving the axis M2 of easy magnetization is the same as that in the case where the metallic magnetic film 23a is formed within the longitudinal grooves 22a.

It is to be noted that, in giving magnetic anisotropy to the metallic magnetic film 23b formed after the longitudinal grooves 22b are formed, in the case where magnetic field is applied so that magnetic anisotropy is provided, it is necessary to select a metallic magnetic film so that the direction of anisotropy of the metallic magnetic film 23a formed at the longitudinal grooves 22a is not disturbed, and anisotropy can be given to the metallic magnetic film 23b formed after the lateral grooves 22b are formed. As selection of such metallic magnetic film, it is sufficient that, e.g., the metallic magnetic film 23a formed at the longitudinal groove 22a is caused to be FeAlSi film and the metallic magnetic film 23b formed after the lateral grooves 22b are formed is caused to be amorphous film.

Figure 19:
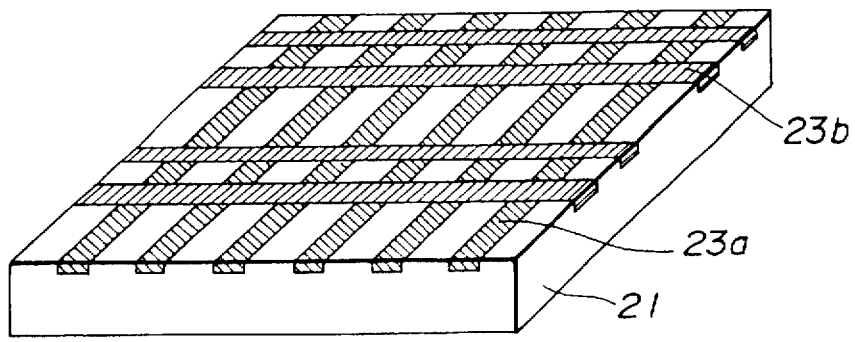
FIG. 19 is a schematic perspective view showing a process for removing unnecessary metallic magnetic film.

Then, as shown in FIG. 19, ion milling or mirror processing, etc. is implemented to the surface where the metallic magnetic film 23b is formed to remove unnecessary portions of the metallic magnetic film 23b thereafter to implement mirror processing thereto. At this time, the metallic magnetic film 23b is caused to undergo processing such that it is left only within the lateral grooves 22b and the film thickness of the remaining portion is caused to be the track width.

Figure 20:
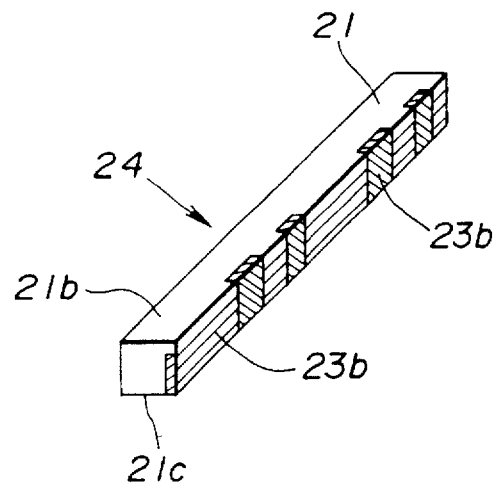
FIG. 20 is a schematic perspective view showing a process for making up tanzaku shaped base.

Then, as shown in FIG. 20, the base 21 is cut in a tanzaku form to make up tanzaku-shaped bases 24. At this time, one cutting plane 21b is caused to be butting plane surface between the magnetic core half bodies and the other cutting plane 21c is caused to be the plane surface of the opposite side of the butting plane surface.

Figure 21:
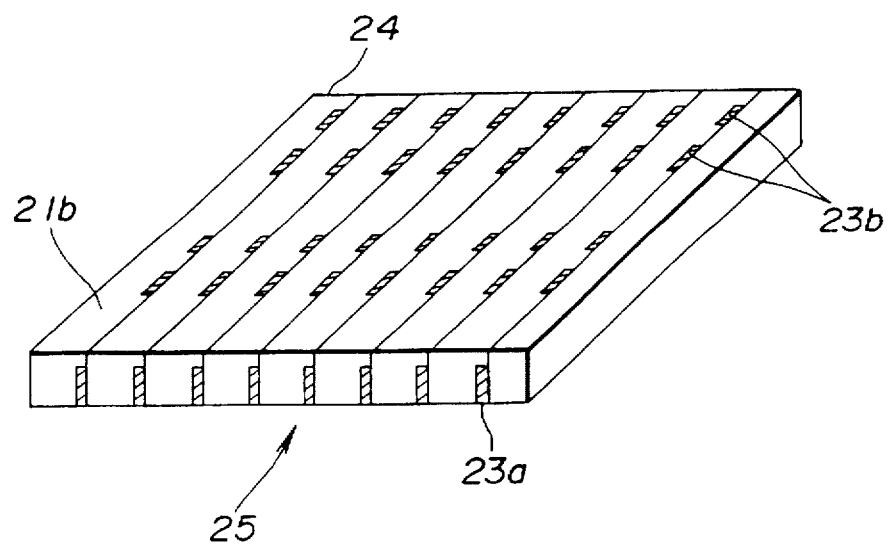
FIG. 21 is a schematic perspective view showing a process for making up a joined base.

Then, as shown in FIG. 21, the plurality of tanzaku-shaped bases 24 are joined and integrated, thus to make up a joined base 25. At this time, joining is made so that the butting plane surface is caused to be the upper principal surface 21b. In this example, joining is carried out by glass fusion or low temperature metal joining (e.g., diffusion joining of gold), etc.

Figure 22:
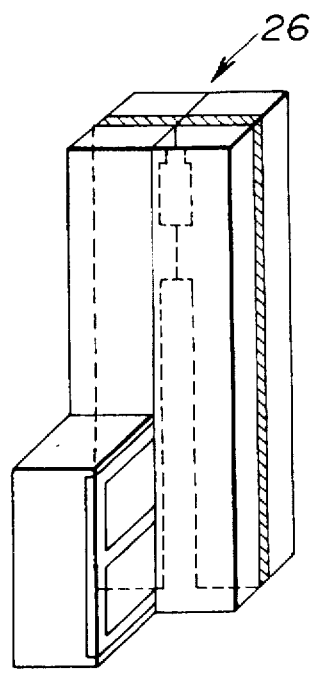
FIG. 22 is a schematic perspective view showing a magnetic head obtained by the embodiment 2.

This joined base 25 is used to make up a magnetic head 26 as shown in FIG. 22 after undergone process steps such as formation of the thin film coil, and joining and integration of a pair of magnetic core half bodies, etc.

Figure 23:
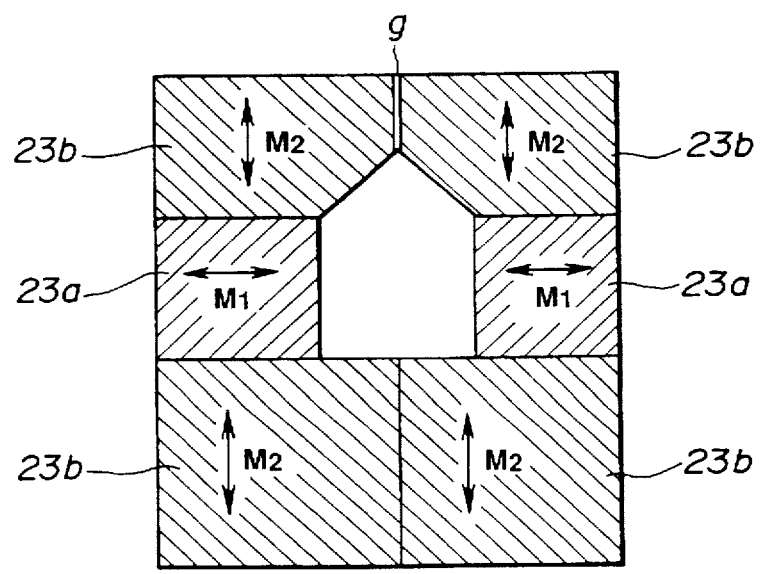
FIG. 23 is a cross sectional diagram showing, in a model form, axis of easy magnetization of magnetic core of the magnetic head shown in FIG. 22.

Such magnetic head of this embodiment can obtain the effect that high reproduction efficiency can be obtained in addition to the effect of the magnetic head of the embodiment 1. This is because the magnetic head of this embodiment is as shown in FIG. 23 such that the magnetic core consists of metallic magnetic films 23a formed at the longitudinal grooves 22a (see FIG. 14) where the axis M2 of easy magnetization is in parallel to the depth direction of the magnetic gap g and metallic magnetic films 23b formed at the lateral grooves 22b (see FIG. 14) where the axis M1 of easy magnetization is perpendicular to the depth direction of the magnetic gap g, and axes of easy magnetization M1, M2 of respective metallic magnetic films 23a, 23b are always in a direction substantially perpendicular to the direction of magnetic flux.

Embodiment 3

The magnetic head of this embodiment is of a structure in which a pair of magnetic core half bodies in which thin film coils are respectively formed in a spiral form by the thin film formation technique at a pair of bases are attached (stuck) to each other. The magnetic head of this embodiment is the magnetic head characterized in the pattern of the thin film coil, and is constituted substantially in the same manner as that of the embodiment 1 or the embodiment 2 except for the pattern of the thin film coil. Accordingly, explanation will be given mainly in connection with the pattern of the thin film coil.

Figure 24:
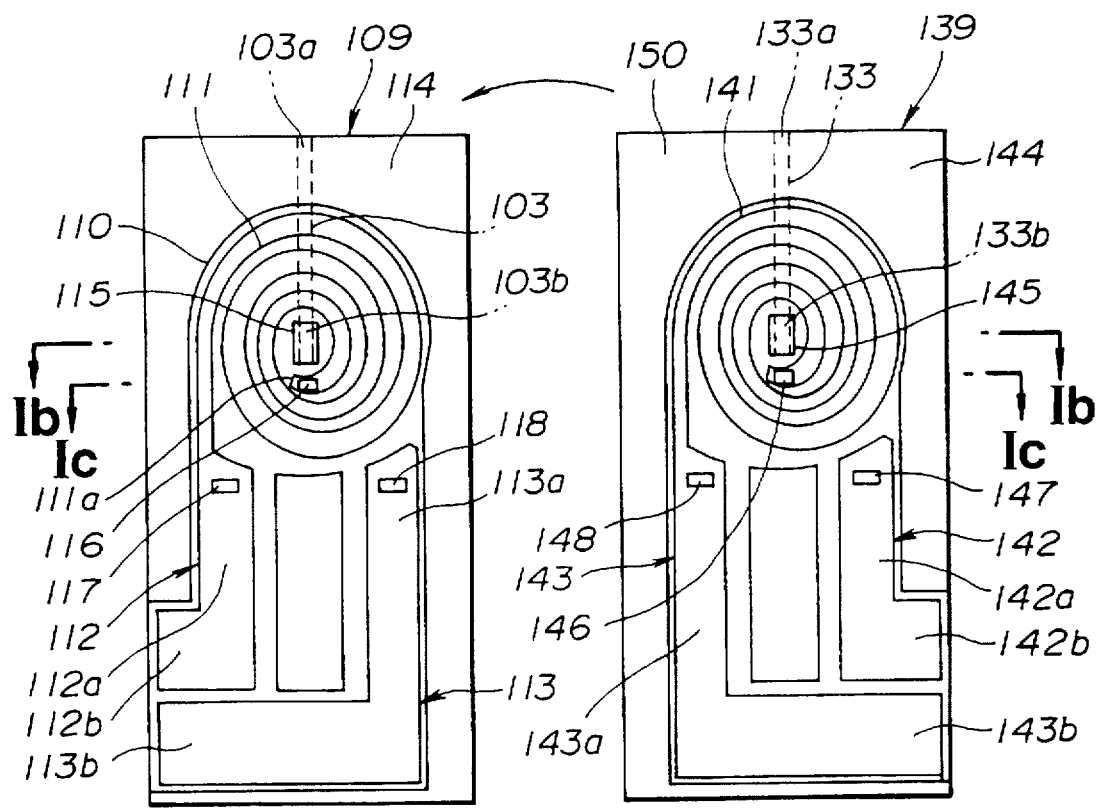
FIG. 24 is a plan view showing an example of a pair of magnetic core half bodies.
Figure 25:
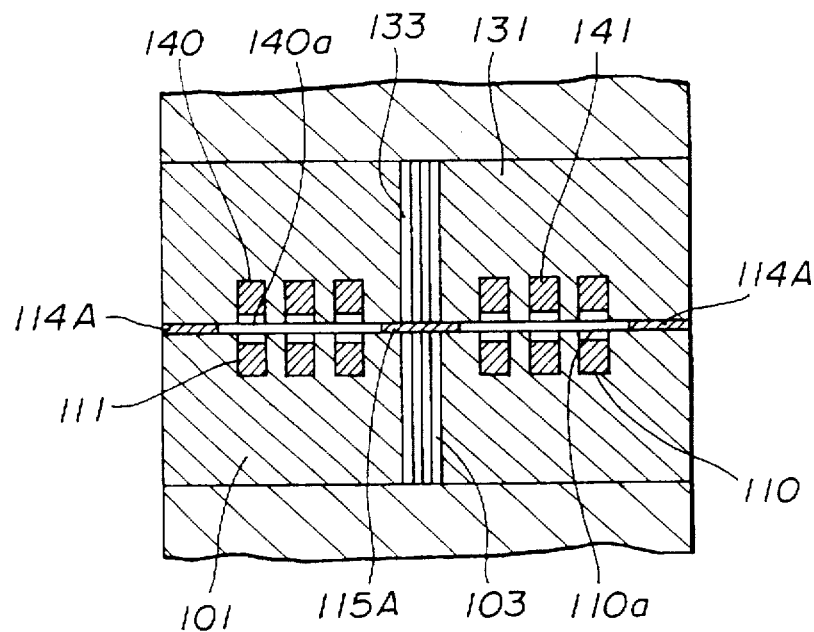
FIG. 25 is an essential part enlarged cross sectional view when a magnetic head in which the pair of magnetic core half bodies shown in FIG. 24 are joined is cut on the plane along Ib—Ib lines of FIG. 24.
Figure 26:
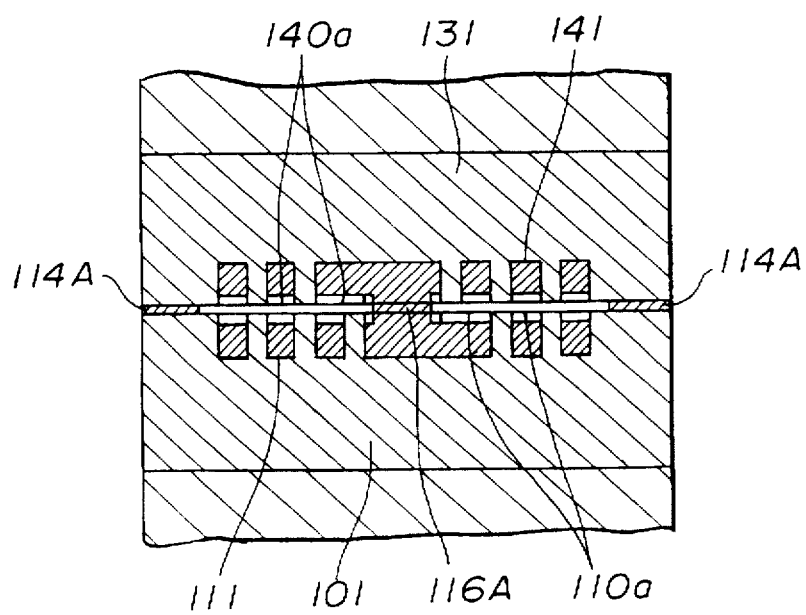
FIG. 26 is an essential part enlarged cross sectional view when the magnetic head in which the pair of magnetic core half bodies shown in FIG. 24 are joined is cut on the plane along the Ic—Ic lines of FIG. 24.

FIGS. 24, 25 and 26 show a pair of magnetic core half bodies constituting the magnetic head of this embodiment. FIG. 24 is a plan view of the pair of magnetic core half bodies. FIG. 25 is an essential part enlarged cross sectional view showing the state where the magnetic head comprised of a pair of magnetic core half bodies of FIG. 24 attached (stuck) to each other is cut on the plane along the Ib—Ib lines of FIG. 24, and FIG. 26 is an essential part enlarged cross sectional view showing the state where the magnetic head comprised of the pair of magnetic core half bodies attached (stuck) to each other of FIG. 24 similar to the above is cut on the plane along the Ic—Ic lines of FIG. 24. As indicated by the arrow in FIG. 24, the other magnetic core half body 139 which takes substantially the same shape as that of one magnetic core half body 109 is attached (stuck) to one magnetic core half body 109. Thus, a magnetic head is constituted.

The magnetic core half body 109 is constituted as follows. A recessed portion 110 is formed in a coil pattern form on a ceramic base (substrate) 101, and a thin film coil 111 is formed within the recessed portion 110. In the vicinity of an inside front end portion 111a of the thin film coil 111, the portion serving as a back gap 103b of a metallic magnetic layer 103 is exposed onto the base 101. The metallic magnetic layer 103 is buried extending from the portion serving as the back gap 103b to one end surface side of the base 101, and the end surface side becomes the portion serving as a front gap 103a.

One terminal portion 112 extending to the other end surface side of the base 101 is extended at the outside front end portion of the thin film coil 111, and the other terminal portion 113 spaced from the thin film coil 111 is provided in parallel to a terminal portion 112. The metallic magnetic layer 103 is formed on the inclined surface of the groove provided at the base 101.

A film 114 of gold is deposited around the thin film coil 111, a film 115 of gold is deposited on the back gap portion 103b of the metallic magnetic layer 103, a film 116 of gold is deposited on the inside front end portion 111a of the thin film coil 111, a film 117 of gold is deposited on the portion connecting to the terminal portion 112 of the thin film coil 111, and a film 118 of gold is deposited on the inside front end portion of the terminal portion 113.

It is to be noted that the magnetic core half body 139 is caused to be of a structure substantially similar to the magnetic core half body 109, and reference numerals obtained by adding "30" to reference numerals of portions corresponding to those of the magnetic core half body 109 are respectively attached to portions constituting the magnetic core half body 139. In FIG. 24, reference numerals 112a, 113a, 142a, 143a respectively denote L-shaped terminal connecting portions, and reference numerals 112b, 113b, 142b, 143b respectively denote terminal portions.

As seen from FIGS. 24, 25 and 26, when the magnetic core half bodies 109, 139 are attached (stuck) to each other, the metallic magnetic films 103, 133 form a closed magnetic path, whereby a front gap 114A is formed by films 114, 144 of gold and a back gap 115A is formed by films 115, 145 of gold. Further, the thin film coils 111, 141 are connected through a film 116A of gold consisting of films 116, 146 of gold to constitute a single coil.

Thus, a current inputted from the terminal portion 112 flows into the terminal portion 113 after successively passing through the thin film coil 111, the films 116, 146 of gold, the thin film coil 141, and a film 148 of gold of a connecting portion 143. It is a matter of course that current can flow in a direction opposite to the above. The films 117, 147 of gold are not required for electrical connection between the thin film coils, but serve to prevent shaking in sticking together magnetic core half bodies 109, 139.

The thin film coils 111, 141 within the recessed portions 110, 140 are not completely filled into the recessed portions 110, 140 in the area except for central end portions 111a, 141a, and spaces 110a, 140a are formed at the recessed portion opening side portions as shown in FIGS. 25 and 26. Namely, the upper surfaces of the thin film coils 111, 141 are caused to be positioned at a level which does not reach the openings of the recessed portions 110, 140 in the above-mentioned area.

The above-mentioned spaces 110a, 140a are provided, thereby making it possible to sufficiently take a gap (clearance) between thin film coils 111, 141 in the state where the magnetic core half bodies 109, 139 are attached to each other (stuck together). Thus, the possibility that current leak between both thin film coils 111, 141 may take place is eliminated.

When the recessed portion in coil pattern form is provided at the base portion of the magnetic core half body and the thin film coil is formed at the recessed portion as in the case of the magnetic head of this embodiment, the thin film coil is protected by the base (substrate). Accordingly, in implementing processing (e.g., joining of magnetic core half body) to the magnetic core half body, there is no possibility that the thin film coil may undergo damage by processing. Thus, high reliability can be obtained.

Embodiment 4

The magnetic head of this embodiment is of a structure in which a pair of magnetic core half bodies provided with a magnetic layer and a thin film coil formed as double layer are joined. The magnetic head of this embodiment is the magnetic head characterized in that the thin film coil is formed as double layer, and is constituted similarly to the embodiment 1 or the embodiment 2 except for the thin film coil. Accordingly, explanation will be given mainly in connection with the thin film coil.

Figure 27:
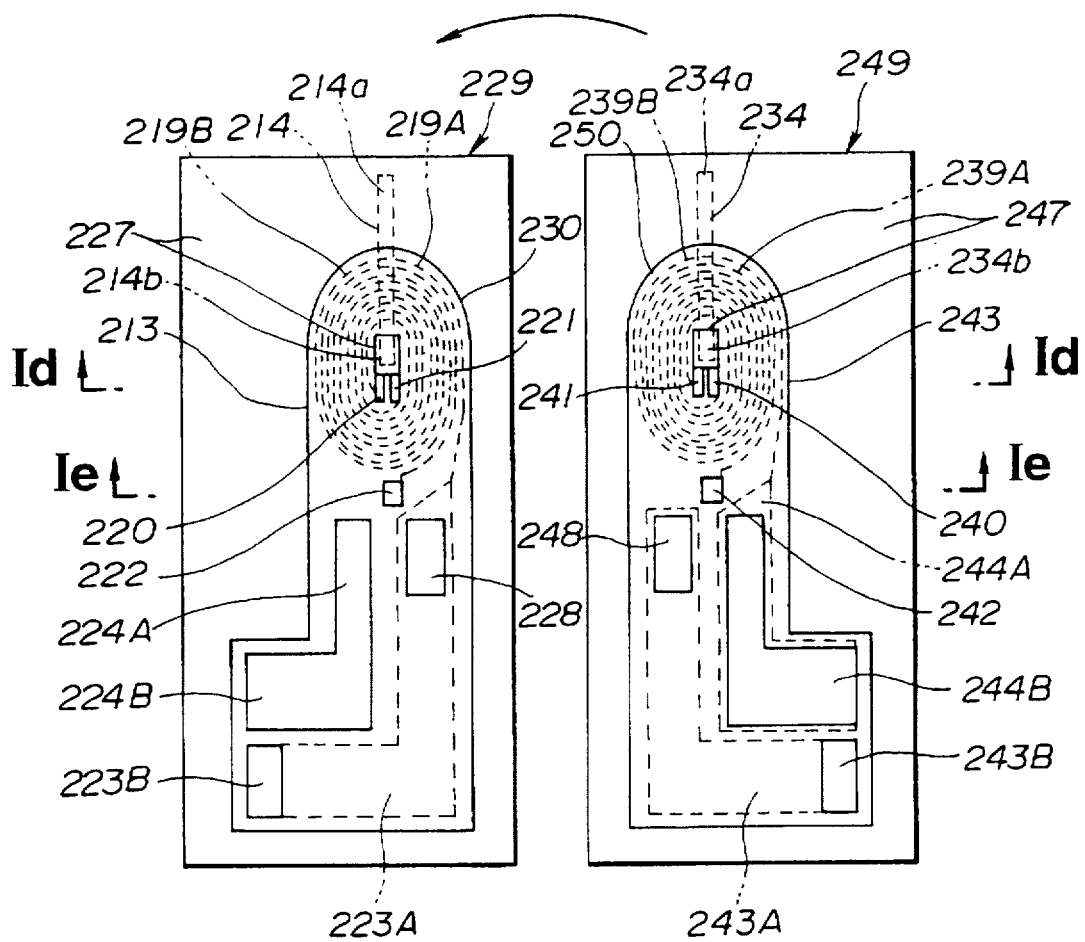
FIG. 27 is a plan view showing another example of a pair of magnetic core half bodies.
Figure 28:
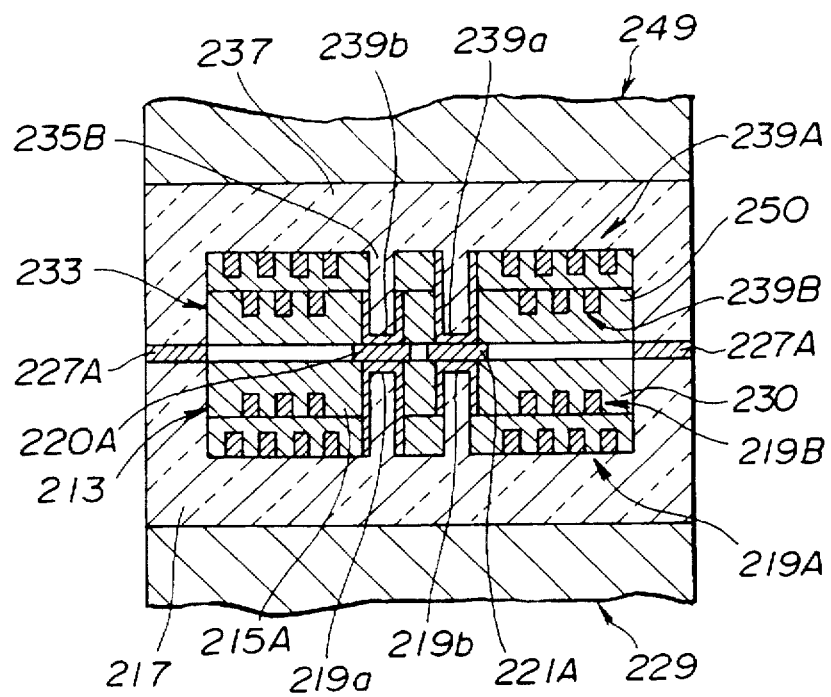
FIG. 28 is an essential part enlarged cross sectional view when a magnetic head in which the pair of magnetic core half bodies shown in FIG. 27 are joined is cut on the plane along the Id—Id lines of FIG. 27.
Figure 29:
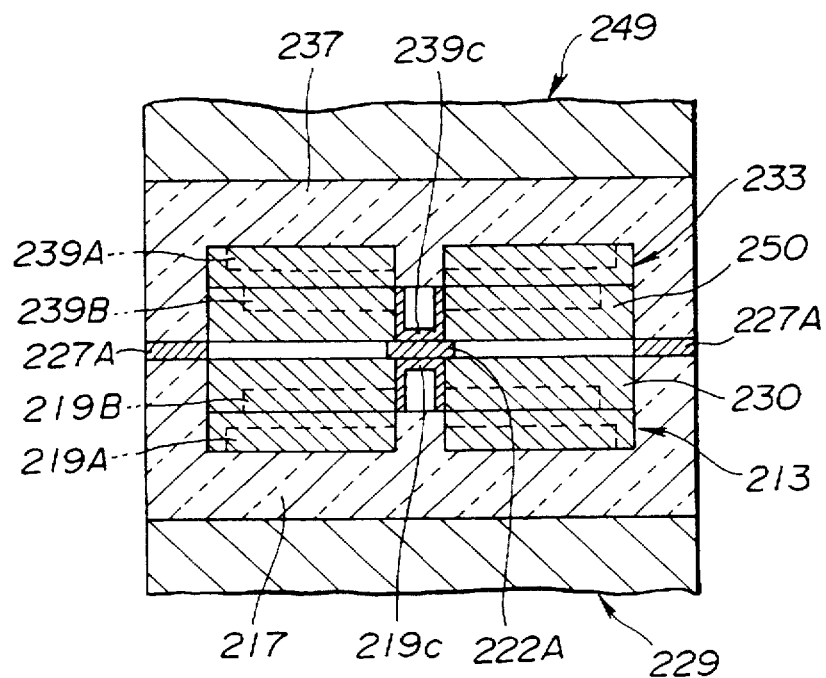
FIG. 29 is an essential part enlarged cross sectional view when the magnetic head in which the pair of magnetic core half bodies shown in FIG. 27 are joined is cut on the plane along the Ie—Ie lines of FIG. 27.

FIGS. 27, 28 and 29 show a pair of magnetic core half bodies constituting the magnetic head of this embodiment, wherein FIG. 27 is an extended plan view of a pair of magnetic core half bodies, FIG. 28 is an essential part enlarged cross sectional view showing the state where a magnetic head comprised of the pair of magnetic core half bodies of FIG. 27 attached (stuck) to each other is cut on the plane along the Id—Id lines of FIG. 27, and FIG. 29 is an essential part enlarged cross sectional view showing the state where the magnetic head comprised of a pair of magnetic core half bodies of FIG. 27 attached (stuck) to each other similar to the above is cut on the plane along the Ie—Ie lines of FIG. 27. As indicated by the arrow in FIG. 27, the other magnetic core half body 249 which takes substantially the same shape as that of one magnetic core half body 229 is attached (stuck) to one magnetic core half body 229. Thus, a magnetic head is constituted.

It is to be noted that the magnetic core half body 249 is substantially the same structure as the magnetic core half body 229, and reference numerals obtained by adding "20" to reference numerals of portions corresponding to those of the magnetic core half body 229 are respectively attached to portions constituting the magnetic core half body 249. In FIG. 27, reference numerals to which [A] is attached denote a lower layer side portion, and reference numerals to which [B] is attached denote an upper layer side portion.

Thin film coils 219A, 219B and terminal portions 223A, 223B, 224A, 224B are disposed within a concave (recessed portion) 213 provided at a ceramic base (substrate) 217 of the magnetic core half body 229. Similarly, thin film coils 239A, 239B and terminal portions 243A, 243B, 244A, 244B are disposed within a recessed portion 233 provided at a ceramic base 237 of the magnetic core half body 249. The thin film coils 219A, 219B and 239A, 239B are spaced to each other by insulating filling materials 230, 250 respectively filled within the recessed portions 213, 233.

At the magnetic core half body 229, the outside termination of the first thin film coil 219A is connected to the first terminal portions 223A, 223B and the inside termination thereof is connected to a contact 220. Moreover, the outside termination of the second thin film coil 219B is connected to a contact 222, and the inside termination thereof is connected to a contact 221. At the magnetic core half body 249, the outside termination of the first thin film coil 239A is connected to the second terminal portions 244A, 244B, and the inside termination thereof is connected to a contact 241. In addition, the outside termination of the second thin film coil 239B is connected to a contact 242, and the inside termination thereof is connected to a contact 240.

When the magnetic core half bodies 229, 249 are joined, inside termination 219a of the first thin film coil 219A of the magnetic core half body 229 is connected as shown in FIG. 28 through contact 220A (the contact 220 and the contact 240 of FIG. 27 are caused to be in pressure contact with each other) to inside front end 239b of the second thin film coil 239B of the magnetic core half body 249. Similarly, inside termination 219b of the second thin film coil 219B of the magnetic core half body 229 is connected through contact 221A (the contact 221 and the contact 241 of FIG. 27 are caused to be in pressure contact with each other) to inside termination 239a of the first thin film coil 239A of the magnetic core half body 249.

Further, as shown in FIG. 29, outside termination 239c of the second thin film coil 239B of the magnetic core half body 249 is connected through contact 222A (the contact 222 and the contact 242 of FIG. 27 are caused to be in pressure contact with each other) to outside termination 219c of the second thin film coil 219B of the magnetic core half body 229.

Connections between the thin film coils are carried out in a manner as described above.

By the above-mentioned joining between the magnetic core half bodies 229, 249, front end portions 214a, 234a of magnetic layers 214, 234 are joined through metallic thin film 227A (metallic thin films 227, 247 of FIG. 27 are caused to be in pressure contact with each other). Thus, a front gap is formed by the metallic thin film 227A. Similarly, rear end portions 214b, 234b of the magnetic layers 214, 234 are joined through the metallic thin film 227A. Thus, a back gap is formed by the metallic thin film 227A.

In such a magnetic head, since the thin film coil formed at the magnetic core half body is caused to consist of the first thin film coil and the second thin film coil, the number of windings of the coil is increased. Accordingly, in the magnetic head of this embodiment, because the number of windings of the coil is increased, high output can be obtained. In this case, the first and second thin film coils can be both formed by the photolithography technology so as to take a predetermined pattern. Accordingly, such increased number of windings of coil can be easily attained.

Figure 30:
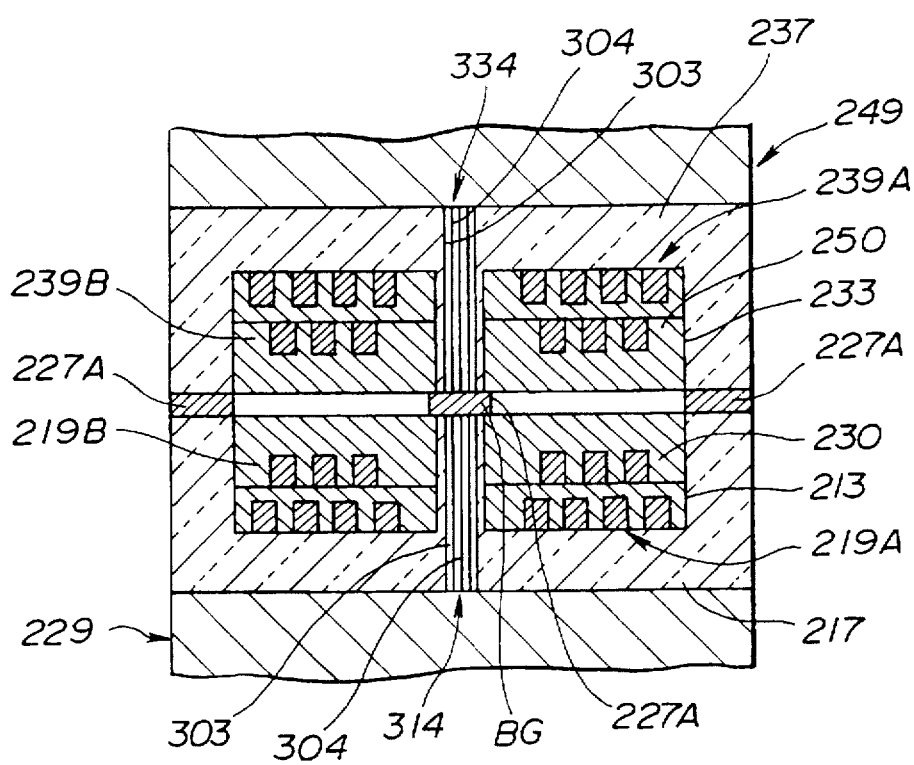
FIG. 30 is an essential part enlarged cross sectional view showing another example of the magnetic head.

It is to be noted that the magnetic layer may be metallic magnetic layers 314, 334 having a stacked layer structure as shown in FIG. 30. In this example, the metallic magnetic layers 314, 334 are caused to be of a structure in which metallic magnetic films 303 are stacked through insulating layers 304. In this case, it is sufficient that the thickness of the metallic magnetic film 303 is about 3~10 μm, the total thickness thereof is about 5~10 μm, and the thickness of the insulating layer 304 is about 70–200 nm. As the insulating layer 304, materials which are chemically stable and have good insulating property such as $Al_2O_3$, $SiO_2$, $TiO_2$ or $Si_3N_4$, etc. are suitable. As stated above, the metallic magnetic film 303 is separated by insulating film such as oxide or nitride, etc., thereby making it possible to obtain a magnetic head excellent in the recording/reproduction characteristic in the higher frequency region. This is because the magnetic layer is separated into thin magnetic layers, whereby magnetic loss by eddy current can be avoided.

Figure 31:
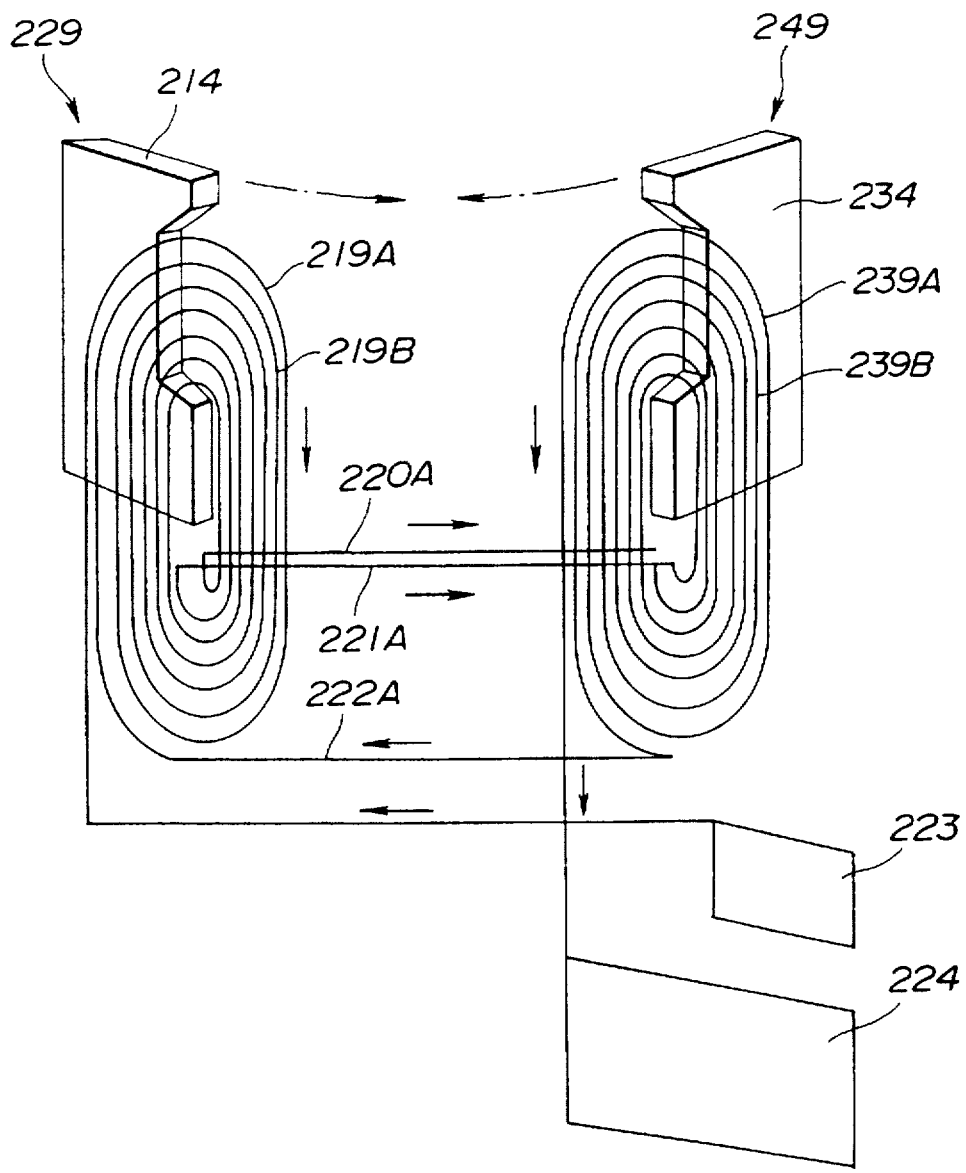
FIG. 31 is a model view showing an example of the state of connection between thin film coils.

The state of the thin film coils connected in a manner as described above is shown, in a model form, in FIG. 31. As shown in FIG. 31, at magnetic core half bodies 229, 249, thin film coils are formed by two layers in the state separated in upper and lower directions. Further, these thin film coils are wound in the same direction (in counterclockwise direction in this example) when viewed from the magnetic gap surface (joining surface of the magnetic core half body).

The outside termination of the thin film coil (first thin film coil) 219A of the lower layer side of the first magnetic core half body 229 is connected to the terminal portion 223, and the inside termination thereof is connected to the inside termination of the thin film coil (second thin film coil) 239B of the upper layer side of the second magnetic core half body 249 through the first contact 220A. The outside termination 239C of the second thin film coil 239B is connected to the outside termination 219C of the second thin film coil 219B of the first head (magnetic core) half body 229 through the third contact 222A, the inside termination of the second thin film coil 219B is connected to the inside termination of the first thin film coil 239A of the second magnetic core half body 249 through the second contact 221A, and the outside termination of the first thin film coil 239A is connected to the second terminal portion 224.

The winding directions and the connections of the respective thin film coils are carried out in a manner as described above, whereby a current which has been delivered from the first terminal portion 223 is caused to flow in the same direction (in clockwise direction in this example) at respective thin film coils and reaches the second terminal portion 224, at which the directions of magnetic flux linking with the magnetic layers 214, 234 are caused to be the same. Accordingly, an output twice greater than in the case where thin film coils are provided by one layer can be obtained. Moreover, there is no possibility that respective coils three-dimensionally cross each other (the coil of the upper layer side bridges over the coil of the lower layer side). Thus, patterning of the thin film coil is facilitated and is caused to be precise. If there is any portion where thin film coils three-dimensionally cross each other, mask for patterning the thin film of the upper layer by the photolithography might be shifted, with the result that exposure is apt to be uneven. Thus, dimensional accuracy is apt to become poor.

Figure 32:
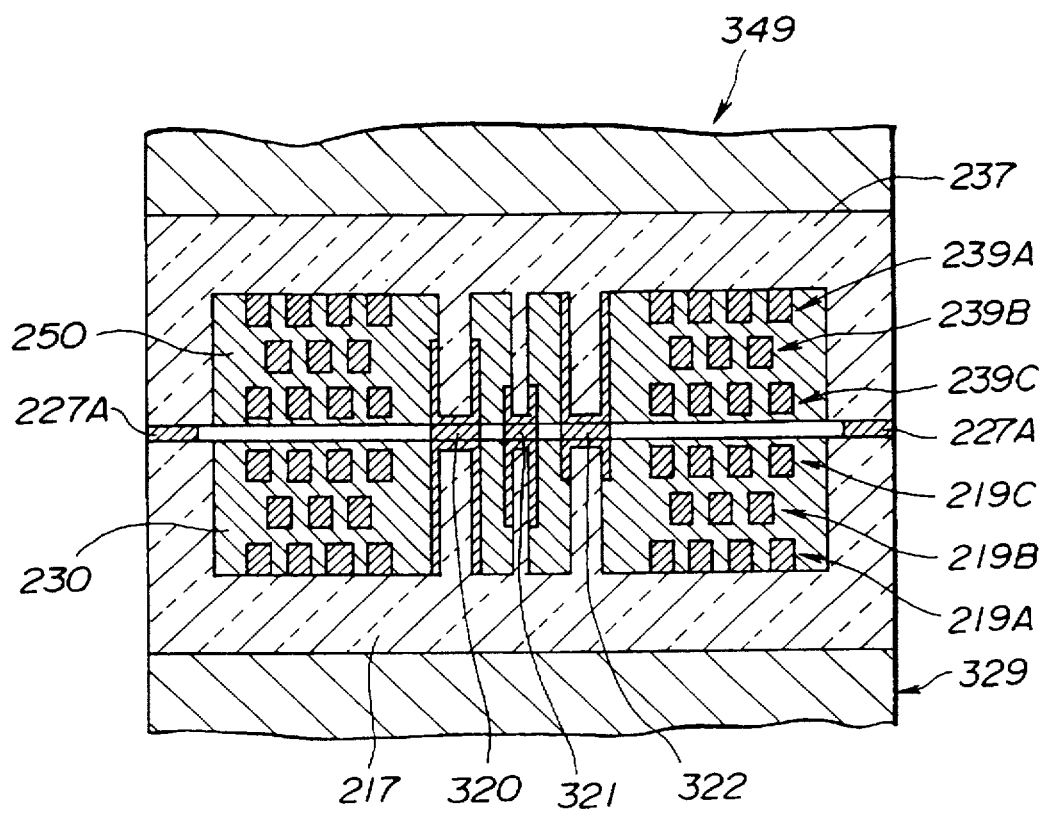
FIG. 32 is an essential part enlarged cross sectional view showing a further example of the magnetic head.

It is to be noted that three layers of thin film coils, or four layers of thin film coils or more may be provided at respective magnetic core half bodies. FIG. 32 is an essential part enlarged cross sectional view showing a magnetic head in which thin film coils are provided by three layers at respective magnetic core half bodies in a manner similar to FIG. 28.

In the magnetic head according to this example, the first terminal portion is connected to the outside termination of the thin film coil 219A of the lower layer side of the magnetic core half body 329, and the inside termination thereof is connected through the metallic thin film 320 to the inside termination of the intermediate thin film coil 239B of the magnetic core half body 349. Further, the outside termination of the thin film coil 239B is connected to the outside termination of the thin film coil 219C of the upper layer side of the magnetic core half body 329, and the inside termination thereof is connected through the metallic thin film 322 to the inside termination of the thin film coil 239A of the lower layer side of the magnetic core half body 349.

The outside termination of the thin film coil 239A is connected to the outside termination of the intermediate thin film coil 219B of the magnetic core half body 329, the inside termination thereof is connected to the inside termination of the thin film coil 239C of the upper layer side of the magnetic core half body 349 through the metallic thin film 321, and the outside termination thereof is connected to the second terminal portion.

Connection between outside terminations of the thin film coils is carried out by metallic thin films (not shown) provided at two portions every respective magnetic core half bodies in conformity with the above-described method. When such connection is made, the total number of windings of coil can be increased 1.5 times grater than that of the above-described magnetic head. Thus, output is also increased 1.5 times.

Industrial Applicability

As apparent from the foregoing description, in the magnetic head according to this invention and the magnetic head manufactured by the method of manufacturing magnetic head according to this invention, there is no possibility that unnecessary opening or groove, etc. may be formed, and there is no necessity of filling glass, etc. Accordingly, even any magnetic film apt to react with glass, etc. can be used. Moreover, since heat treatment for filling glass, etc. is unnecessary, even magnetic films of which characteristics are deteriorated when heat treatment is carried out can be used. In addition, since there is no possibility that filled glass, etc. may be exposed to the medium slide surface, abrasion resistive characteristic is also excellent.

Moreover, the recessed portion for forming the magnetic film is caused to take such a shape to avoid the portion where the thin film coil is to be formed, whereby formation of the thin film coil is carried out on the base. For this reason, in forming the thin film coil, thin film process is implemented mainly to the base (substrate). As a result, the possibility that thin film process is implemented to the magnetic film is eliminated. Accordingly, formation of the thin film coil is easy, and yield is improved to much degree.

Further, the recessed portion for forming the magnetic film is formed by ion milling, thereby making it possible to form the recessed portion at a high speed and precisely.

Furthermore, since the magnetic film is formed only within the recessed portions formed in advance, there hardly takes place warp (curvature) at the base (substrate) by difference between stress of the magnetic film and that of the base. For this reason, a magnetic head having high bonding strength and high reliability is provided.

In addition, the magnetic film is formed by two kinds of magnetic films having axes of easy magnetization perpendicular to each other, whereby control of magnetic anisotropy of the magnetic film can be made. Particularly, axis of easy magnetization of one of two kinds of magnetic films having axes of easy magnetization perpendicular to each other is caused to be in the depth direction of the magnetic gap so that the axis of easy magnetization of the magnetic film is caused to be always substantially perpendicular to the direction of magnetic flux, whereby reproduction efficiency of the magnetic head is improved.

What is claimed is:

1. A magnetic head assembly comprising a pair of magnetic core half bodies secured together with abutting faces facing each other; wherein:

the magnetic head has a magnetic gap, each core half body has a base on which is formed a magnetic film, at least one base having a recessed portion in which one or more coils is formed, said recessed portion shaped to correspond to a magnetic path of the respective core half body.

2. A magnetic head as set forth in claim 1, wherein the recessed portion is formed by ion milling.

3. A magnetic head as set forth in claim 1, wherein the magnetic film consists of two kinds of magnetic films having axes of easy magnetization perpendicular to each other.

4. A magnetic head as set forth in claim 3, wherein the axis of easy magnetization of the one magnetic film of the two kinds of magnetic films having axes of easy magnetization perpendicular to each other extends in the direction of a depth of the magnetic gap.

5. A magnetic head as set forth in claim 1, wherein the thin film coil is formed in a recessed portion formed in a coil pattern.

6. A magnetic head as set forth in claim 5, wherein thin film coils are formed on both of the pair of magnetic core half bodies, and these thin film coils are electrically connected to form a single coil.

7. A magnetic head as set forth in claim 5, wherein the thin film coil is buried up to a level which does not reach the opening of the recessed portion formed in the coil pattern form.

8. A magnetic head as set forth in claim 1, wherein the thin film coil consists of a first thin film coil and a second thin film coil.

9. A magnetic head as set forth in claim 8, wherein the thin film coil and a second thin film are formed on planar surfaces different from each other.

10. A magnetic head as set forth in claim 8, wherein the first thin film coil and the second thin film coil are electrically connected.

11. A magnetic head as set forth in claim 8, wherein the first thin film coil and the second thin film coil are subjected to dielectric isolation through an insulating layer.

12. A magnetic head as set forth in claim 8, wherein a recessed portion is provided at the plane surface of the side where the thin film coil is to be formed of the magnetic core half body, and the first and second thin film coils are formed within the recessed portion.

13. A magnetic head as set forth in claim 8, wherein first and second thin film coils are formed on both of the pair of magnetic core half bodies with a single coil terminal portion provided on each of the magnetic core half bodies.

14. A magnetic head as set forth in claim 13, wherein the winding directions of the first and second thin film coils are the same on the respective pair of magnetic core half bodies when viewed from the same direction.

15. A magnetic head as set forth in claim 13,
wherein, when viewed from one direction, the winding directions of the first and second thin film coils in the magnetic core half bodies are the same.

16. A magnetic head as set forth in claim 13,
wherein an outside termination of the first thin film coil of the first magnetic core half body is connected to a first terminal portion, an inside termination of the first thin film coil of the first magnetic core half body is connected to an inside termination of the second thin film coil of the second magnetic ore half body, an outside termination of the second thin film coil of the second magnetic core half body is connected to an outside termination of the second thin film coil of the first magnetic core half body, an inside termination of the second thin film coil of the first magnetic core half body is connected to an inside termination of the first thin film coil of the second magnetic core half body, and an outside termination of the first thin film coil of the second magnetic core half body is connected to a second terminal portion.

* * * * *